(12) United States Patent
Hsu (10) Patent No.: US 6,955,434 B2
(45) Date of Patent: Oct. 18, 2005

(54) METHOD AND APPARATUS FOR ADJUSTING COOLING IN PROJECTION SYSTEM

(75) Inventor: Nien-Hui Hsu, Miao-Li (TW)

(73) Assignee: Coretronic Corporation, Miao-Li (TW)

( * ) Notice: Subject to any disclaimer, the term of this patent is extended or adjusted under 35 U.S.C. 154(b) by 1 day.

(21) Appl. No.: 10/709,105

(22) Filed: Apr. 14, 2004

(65) Prior Publication Data

US 2004/0212784 A1 Oct. 28, 2004

(30) Foreign Application Priority Data

Apr. 28, 2003 (TW) .............................. 92110240 A (51) Int. Cl.$^7$ .......................... G03B 21/16; G03B 21/18
(52) U.S. Cl. ..................................................... 353/61
(58) Field of Search ............................ 353/52, 57, 60, 353/61

(56) References Cited

U.S. PATENT DOCUMENTS 6,563,255 B1 * 5/2003 Collins ....................... 362/296
6,641,267 B2 * 11/2003 Ohishi et al. ................. 353/61

* cited by examiner

*Primary Examiner*—Christopher Mahoney
(74) *Attorney, Agent, or Firm*—Winston Hsu (57) ABSTRACT

A method and apparatus for adjusting cooling in a projection system, mainly comprises a fan, a louver installed at an air outlet and a sensor neighbor therewith. The fan is allowed to rotate to drive air at a predetermined rotational speed when the projection system is turned on, the louver is at a predetermined open rate at this time and the sensor is used to detect air temperature. When the air temperature is risen gradually beyond a predetermined temperature, the open rate of the louver is first increased gradually; and, when the air temperature is risen continuously and the open rate of the louver reaches its maximum, the rotational speed of the fan is then increased. When the air temperature is lowered down and the rotational speed of the fan is higher than a predetermined rotational speed, the rotational speed of the fan is first decreased gradually; and, when the air temperature is continuously lowered down and the rotational speed of the fan is decreased reaches its predetermined speed, the open rate of the louver is then decreased gradually. The louver is closed when the system is turned off. Therefore, an airflow resistance is decreased to increase a cooling efficiency so as to alleviate noise of fan by adjusting the open rate of the louver.

17 Claims, 8 Drawing Sheets

METHOD AND APPARATUS FOR ADJUSTING COOLING IN PROJECTION SYSTEM

BACKGROUND OF INVENTION

1. Field of the Invention

The present invention relates to a method and apparatus for adjusting cooling in a projection system, and more particularly to a method and apparatus for adjusting cooling airflow.

2. Description of the Prior Art

Figure 1:
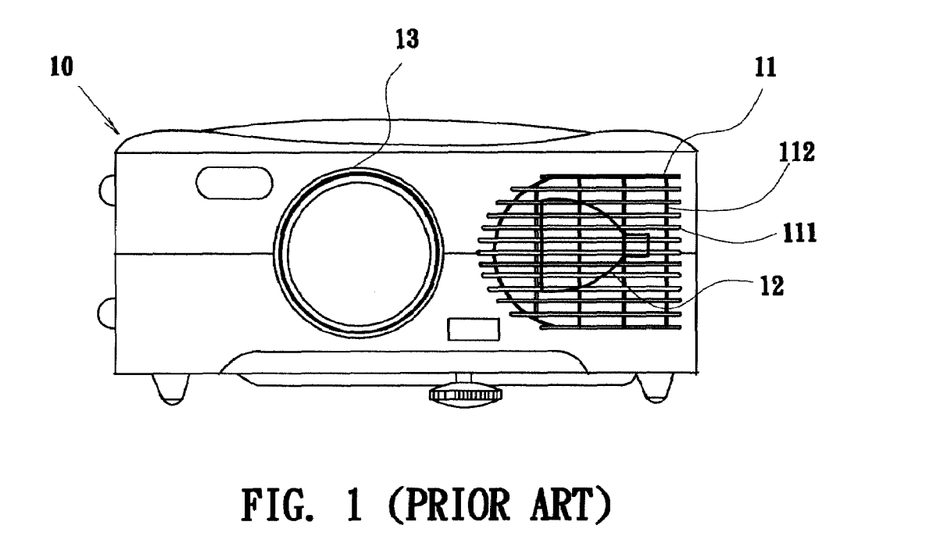
FIG. 1 is a front view of a conventional projection device.

A high power lamp is generally used as an illumination source in a projecting device. Although the high heat yielded from the lamp can be cooled through a fan, but the rotation noise caused from the high speed rotation of the fan always interference a meeting processing or spoil a silent sight amusement environment. As FIG. 1 shows, a lamp 12 is installed in a louver 12 of a conventional projection device 10. An illumination beam is projected from the lamp 12 and then through an optical system in the projection device 10 to form a beam with image information, and finally projected through a projecting lens to show pictures.

Figure 2:
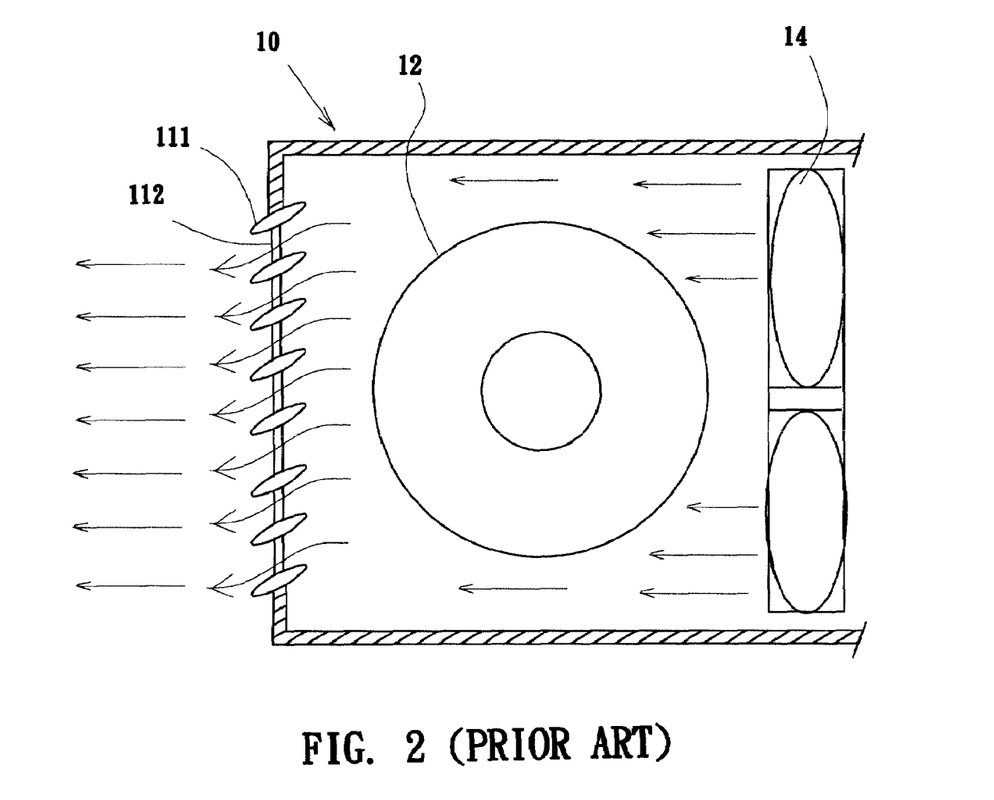
FIG. 2 is a schematic view of a lamp cooling apparatus in a conventional projection device.

As FIG. 2 shows, a fan 14 is installed close to the lamp 12 in the projection device 10 to form an air current to cool the high temperature lamp 12. And, the cooling air passed through the high temperature lamp 12 is allowed to expel out the projection device 11 from the louver 11 installed close to the lamp 12. The louver 11, constructed to be a fixing type louver, consists of a plurality of parallel diversion plates 111 supported by a vertical supporting strip 112, and the diversion plates 111 are inclined downward properly so as to prevent diffusion light emitted from the lamp 12 from escaping out of the louver 11 to influence a projection effect.

However, this kind of the fixing type louver 11 facilitated with the downward inclined diversion plates 111 not only makes airflow to be diverted and then to flow out thereof with the result that the airflow resistance is yielded, but also causes the open area (open rate is approximately 40%) of the louver 11 to be shrunk. This reduces the effective cross-sectional area for hot air to be expelled and has no choice but increases the rotational speed of the fan in order to attain a cooling effect and consequently the noise caused from the fan is elevated and high rotational speed may damage the life of the fan. Besides, the fan with a high fixed rotational speed cannot match up with the operation condition of the projection device 10, the rotational speed of the fan and the effective open cross-sectional area are changed timely to allow the fan to be operated at a proper rotational speed to lessen the load thereof. And, the sudden shrinkage of the effective cross-sectional area of the fixing type louver 11 may also cause the speed of the airflow passed through it to be increased to form wind shear so as to yield noise to influence the broadcasting quality of the projection device.

SUMMARY OF INVENTION

One object of the present invention is to provide a method and apparatus for adjusting cooling in a projection system, controlling the change of the open rate of a louver to decrease airflow resistance so as to attain the best cooling effect and noise shielding by detecting the temperature of a projection system.

Another object of the present invention is to provide a method and apparatus for adjusting cooling in a projection system, adjusting the rotational speed of a fan timely to reduce noise and elevate the life of the fan by detecting the temperature of a projection system.

Still another object of the present invention is to provide a method and apparatus for adjusting cooling in a projection system, attaining a dustproof and bug-proof effect a louver is closed when the system is turned off.

Still still another object of the present invention is to provide a method and apparatus for adjusting cooling in a projection system, preventing the diffusion light from escaping to reduce the random signals of image pictures so as to enhance a sight amusement quality by disposing an airflow channel of the projection system properly.

For attaining the objects mentioned above, an apparatus for adjusting cooling in a projection system comprises a fan, louver installed on an air outlet, airflow channel and sensor near to the airflow channel. When the system is turned on, the fan is allowed to rotate at a predetermined speed to drive air, the louver is at a predetermined open rate and the sensor detects the temperature of air. When the temperature of air is increased beyond a predetermined temperature, the open rate of the louver is first gradually increased. And, when the temperature of air is increased to the maximum open rate of the louver, the rotational speed of the fan is then gradually elevated; when the temperature of air is decreased and the rotational speed of the fan is higher than a predetermined speed, the rotational speed of the fan is first gradually dropped. And, when the temperature of air is gradually decreased and the rotational speed of the fan is already dropped to the predetermined speed, the open rate of the louver is then gradually decreased. When the system is turned off, the louver is closed so as to prevent dust from polluting the optical elements therein and bugs from entering it. Whereby, the air resistance is decreased, the cooling effect is enhanced and the noise of the fan is lowered down all by adjusting the rotational speed of the fan and the open rate of the louver.

BRIEF DESCRIPTION OF DRAWINGS

The present invention can be more fully understood by reference to the following description and accompanying drawings, in which.

DETAILED DESCRIPTION

Figure 3:
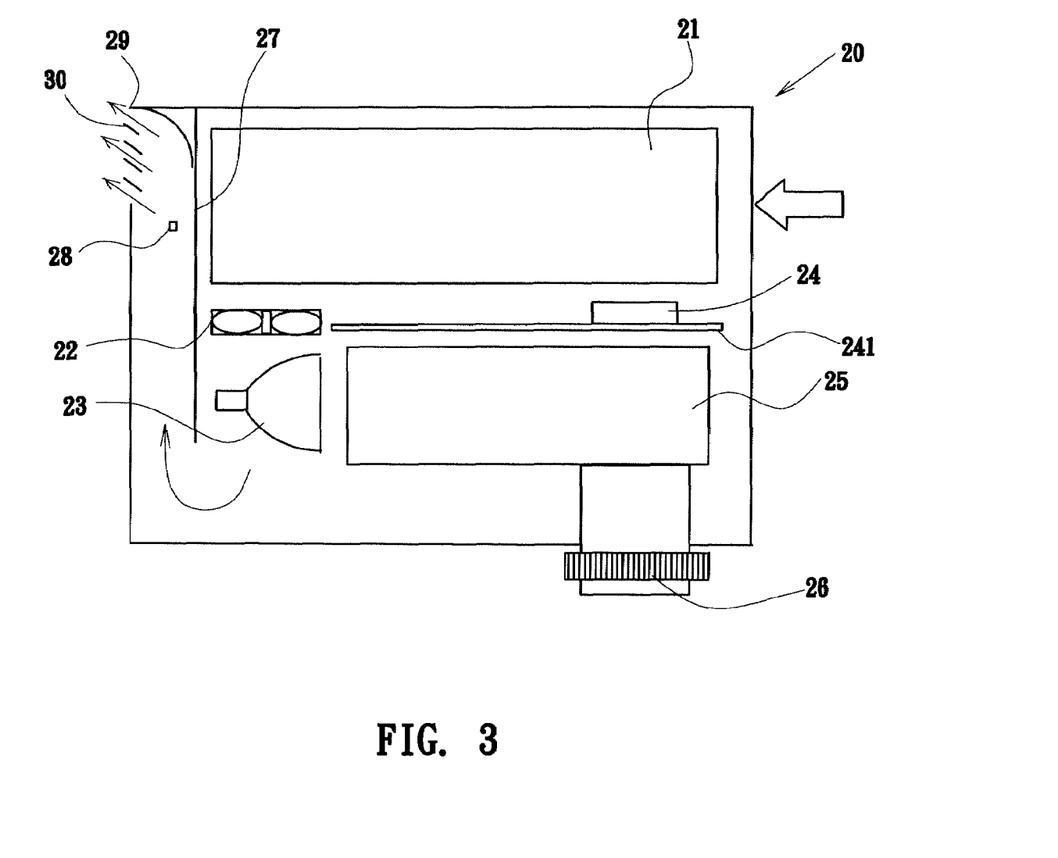
FIG. 3 is a schematic view, showing a projection system according to the present invention.

Please refer to FIG. 3. FIG. 3 shows a projection system according to the present invention. A projection system mainly comprises a motherboard 21, fan 22, lamp 23, optical valve 24, PCB 241, optical engine 25, projection lens 26, airflow channel 27, sensor 28 and air outlet 29. Air outside of the projection system is drawn therein by the fan 22 to cool the motherboard 21 and the optical valve 24, and then, it passes through the fan 22 to cool the lamp 23, the optical engine 25 and the projection lens 26, and finally, the cooling air is guided by the airflow channel 27 and expelled out of the air outlet 29 through the sensor 28 and the louver 30. The diffusion light emitted from the lamp 23 can be prevented from leaking out of the projection system 20, because the disposed location of the air outlet 29 is far away from the lamp 23 and the airflow channel 27 blocks the diffusion light.

Figure 4:
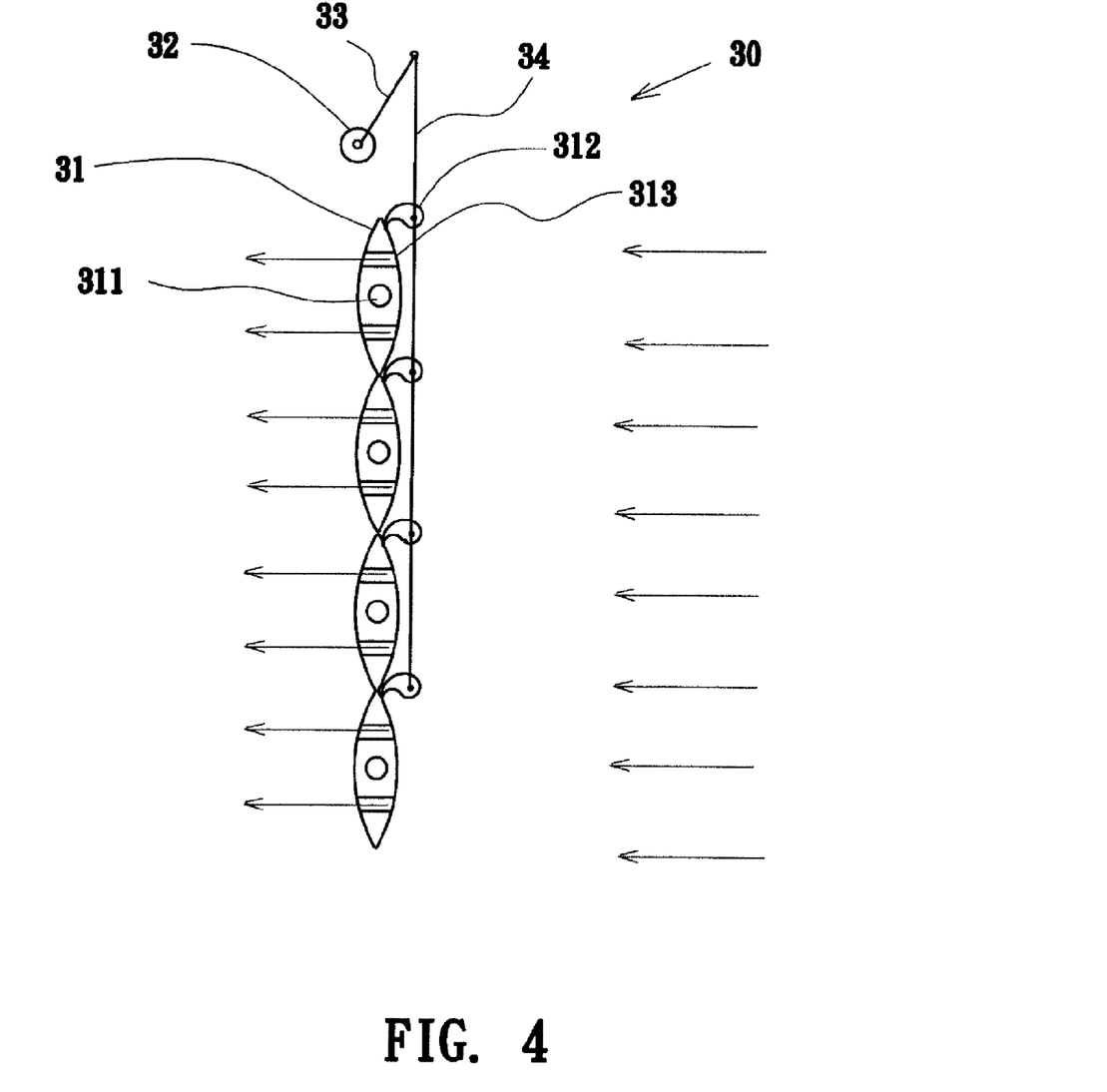
FIG. 4 is a side sectional view, showing a louver at a closing state according to first embodiment of the present invention.

As FIG. 4 shows, the louver 30 on the air outlet 29 mainly comprises a plurality of diversion plates 31, a driving element 32, supporting shaft 33 and link lever 34. The diversion plates 31 are closely connected one after another when the system is turned off so as to shield the air outlet 26; the diversion plate is streamlined shaped and an axis is installed at the center thereof so as to allow the diversion plate to rotate around the axis 311 freely. In addition, one vent 313 is disposed at each of two sides of the axis 311. A pivoting axis 312 is connected to one end of the diversion plate 31. One end of the link lever 34 is connected movably to the supporting shaft 33 and another end thereof is connected to the pivoting axis 312 on each diversion plate 31. The supporting shaft 33 is driven by a driving element 32 (such as a stepping motor) to allow it to take the driving element 32 as a center to rotate to a needed angle.

Figure 5:
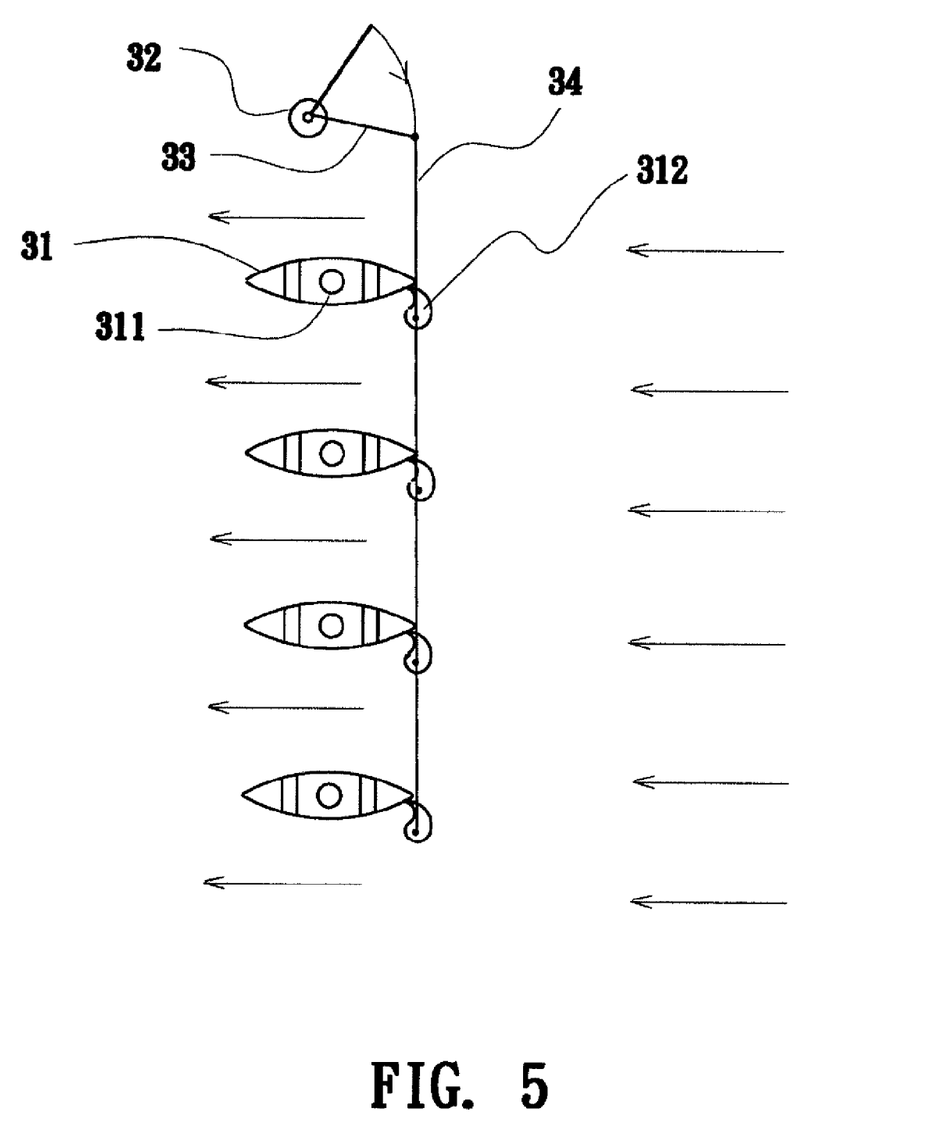
FIG. 5 is a side sectional view, showing a louver at an open state according to first embodiment of the present invention.

Moreover, as FIG. 5 shows, when the driving element 32 drives the supporting shaft 33 to rotate, the supporting shaft 33 will drive the link lever 34 to move each pivoting axis 312 to drive each diversion plate 31 to rotate around the axis 311 to an angle so as to allow each diversion plate 31 to separate from one another to cause the open rate to increase gradually or stepwise. And, when the diversion plate 31 are rotated to be parallel with the airflow line, the open rate is increased to the maximum (up to 80% approximately), the airflow resistance caused from the louver 30 is lowered down to the minimum.

Figure 6:
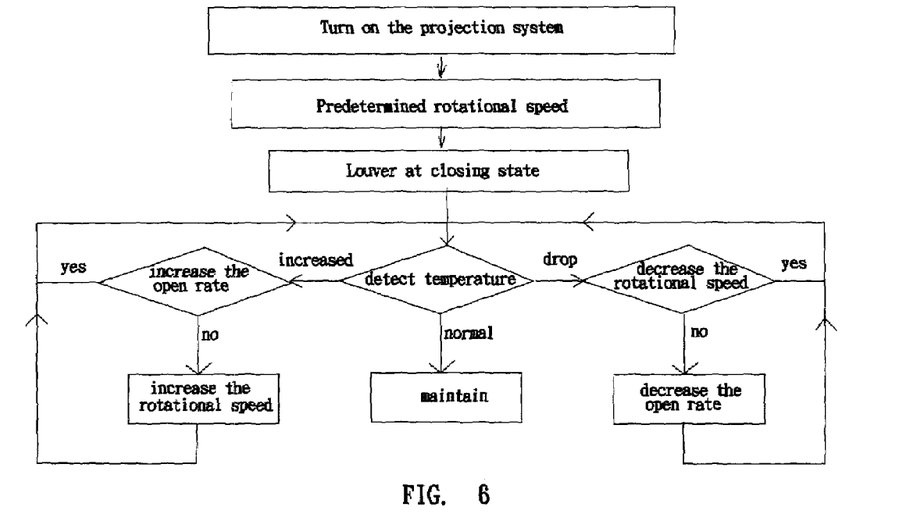
FIG. 6 is a flow chart, showing steps of a method for adjusting cooling in a projection system according to first embodiment of the present invention.

As to a method for adjusting cooling in a projection system according to the present invention, please refer to FIG. 6. First, turn on the projection system 20. The temperature of the projection system 20 is unlikely to be elevated too fast because the system 20 is just turned on; allow the fan 20 to be turned at a lower predetermined rotational speed. Although the louver 30 is not opened at this time, but the air yielded from the fan 22 turned at a lower speed still can flow through the louver 30 by means of the vent 313 disposed thereon. And, the temperature detected by the sensor 28 is also within the range of the preset normal temperatures so that the projection system 20 is maintained to operate at a normal condition. After the system 20 is tuned on over a certain period, because the illumination of the high power lamp 23 is continued, the sensor 28 will detect that the temperature of the airflow is rising.

When the detected temperature is beyond the preset normal temperature, control the driving element 32 to move the supporting shaft 33 and the link lever 34 to drive each diversion plate 31 to rotate an angle. Open each diversion plate 31 to a proper preset angle, the open rate of the louver 30 is gradually increased to reduce an airflow resistance when the airflow is passed through it so as to enhance a cooling efficiency until the temperature detected by the sensor 28 is not longer increased, thereby, the rotational speed of the fan 22 can be prevented from being increased so that the life of the fan can be lasted and the noise caused from the fan 22 can be prevented from elevating.

If the temperature of the projection system is increased continuously, and the rotated angle of each diversion plate 31 is already parallel with the direction of the airflow, i.e. the open rate of the louver 30 is the maximum at this time. And then, increase the rotational speed of the fan 22 gradually so as to increase the amount of the airflow to enhance a cooling effect to allow the projection system 20 to be maintained at a proper operation temperature. Besides, the rotated angle of each diversion plate 31 has already been parallel with the direction of the airflow; the airflow resistance is allowed to reduce to the minimum so that the wind shear noise yielded from the airflow can be prevented.

On the other hand, when the projection system 20 is at a standby state when the light thereof is turned off halfway, the airflow therein is over large or a low illumination projection mode thereof is used, once a temperature drop is detected by the sensor 28, first control the fan 22 to decrease the rotational speed gradually until the normal predetermined speed thereof is recovered so as to extended the life of the fan 22. If the sensor 28 detects that the temperature is gradually dropping, and then control the driving element 32 to drive each diversion plate 31 to rotate an angle to decrease the open rate of the louver 30 step by step until the air outlet 29 is closed. And now, proper ventilation is maintained through the vents 313 on each diversion plate 31 and the noise of the fan 22 is blocked and maintained in an appropriate amount. When the projection system 20 is turned off, the fan 22 and the louver 30 are closed at the same time. The diversion plates 31 connected closely with one another can be used to prevent dust from polluting the optical elements in the projection system 20. Meanwhile, small bugs can also be prevented from entering the system with a smaller open of the vent 313.

Figure 7:
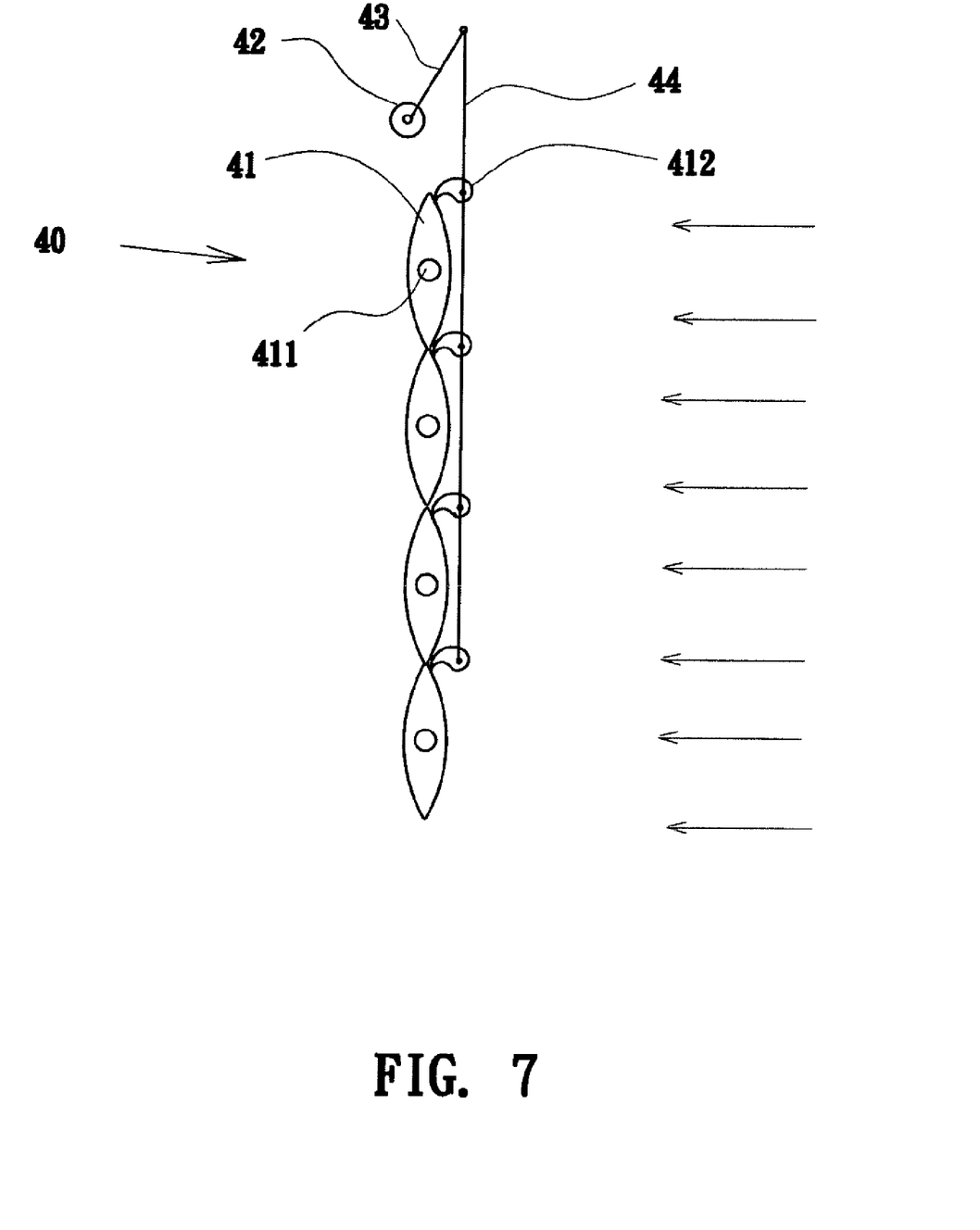
FIG. 7 is a side sectional view, showing a louver at a closing state according to second embodiment of the present invention.

Please refer to FIG. 7. An apparatus for adjusting cooling in a projection system of second embodiment according to the present invention, the basic structure thereof is as same as second embodiment according to the present invention. The same elements in first and second embodiments are labeled as the same numbers except the louver 30 in the projection system 20. The manner that a supporting shaft 43 and link lever 44 are driven by a driving element 42 to allow diversion plates 41 to rotate around an axis 411 through a pivoting axis 412 in a louver 40 according to second embodiment is also same as the first embodiment mentioned above. A difference between them is that vents 313 disposed in the first embodiment are not disposed on each diversion plate 41. The louver 40 can first be rotated to a predetermined angle through the driving element 42 to open a proper open when the system is turned on according the adjustment method of the second preferred embodiment, the rest adjustment controlling steps are as same as the first preferred embodiment.

Figure 8:
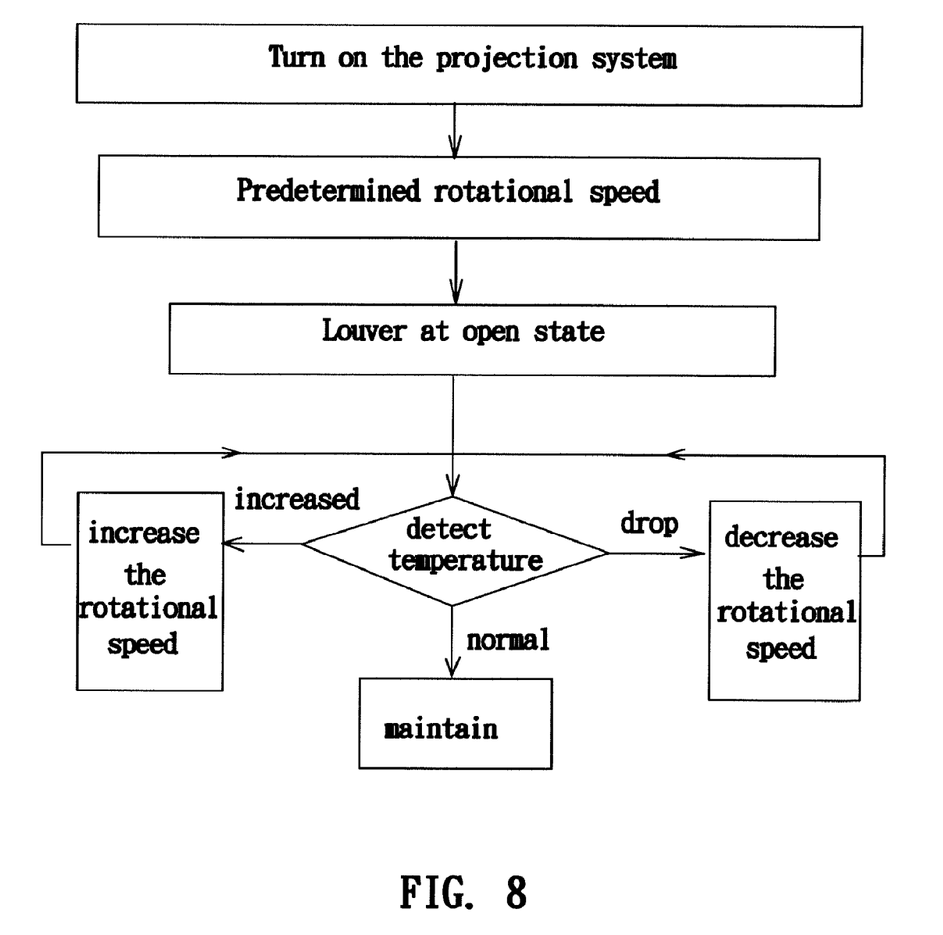
FIG. 8 is a flow chart, showing steps of a method for adjusting cooling in a projection system according to second embodiment of the present invention.

However, as FIG. 8 shows, the projection system 20 can first be turned on according the adjustment method of the second preferred embodiment. The fan 22 is allowed to rotate at a lower predetermined rotational speed, and the louver 40 is driven by the driving element 42 to rotate to a direction parallel to the direction of the airflow at the same time to cause the open rate to increase to the maximum. The airflow resistance is lowered down to the minimum so as to attain the maximum cooling effect. The fan 22 is allowed to rotate at a lower rotational speed so as to alleviate the noise and to lengthen the life of the fan. And then, the temperature of the airflow channel 27 is detected through the sensor 28. The rotational speed of the fan is gradually increased when the temperature is increased to a predetermined speed and on the other hand, the rotational speed of the fan 22 is decreased when the temperature is low so as to allow the fan 22 to provide a sufficient cooling airflow timely. Whereby, the fan 22 can be prevented from rotating continuously at a high rotational speed to reduce noise. And, when the projection system 20 is turned off, the louver 40 is driven to a vertical direction through the driving element 42 to seal the air outlet 20 so as to prevent dust and bugs from polluting the optical elements in the projection system 20.

The same as above, A method and apparatus for adjusting cooling in a projection system according to the present invention is also can be utilized on an air inlet of a projection device. The open and the close of the air inlet are processed accompanying with the open and the close of the louver of the air outlet, or the air inlet is fully opened or fully closed when the projection system is turned on or off, so as to attain better dustproof and bugs-proof effects.

Figure 9:
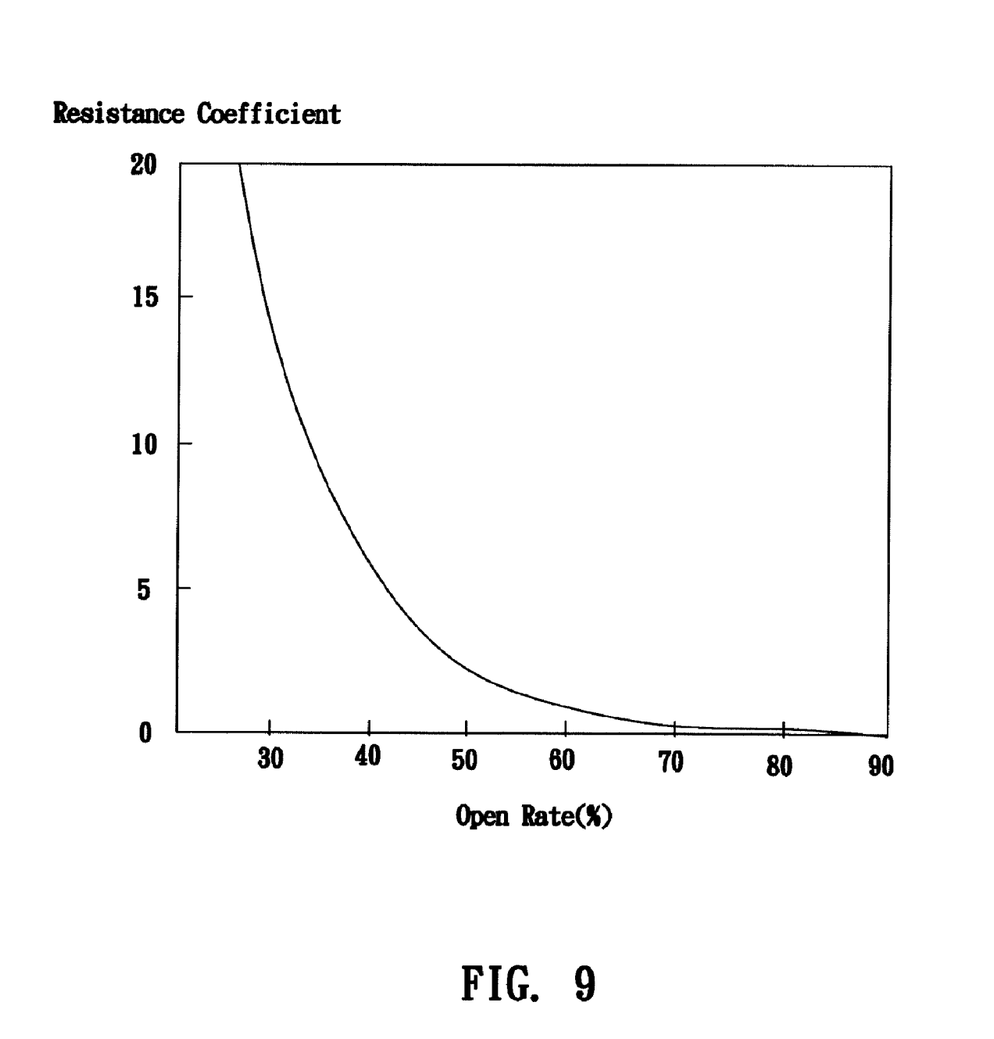
FIG. 9 is a graph, showing a relationship between an open rate of a louver and airflow resistance coefficient.

Finally, please refer to FIG. 9. FIG. 9 shows a relationship between an open rate of an air outlet of a projection device and a resistance coefficient. The open rate of a conventional fixed type open of a louver is 40% and the resistance coefficient thereof is 6. The best open rate of a movable type louver according to the present invention can reach even to 80% approximately and the resistance coefficient thereof is 0.18. Under comparison, the airflow resistance can be lower down up to 3% of the fixed type louver. A fan is rotated at a lower rotational speed according to the present invention when an open rate is low so that the influence of airflow resistance is alleviated so that a fluent airflow is provided and a cooling effect of a projection device is enhanced.

It is noted that the method and the apparatus for adjusting cooling in a projection system described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A method for adjusting cooling in a projection system, said projection system comprising a fan, a louver and a sensor installed between said fan and said louver, said method comprising the following steps:
    (1) allowing said fan to rotate at a predetermined rotational speed to drive air and said louver to be at a predetermined open rate when said system is turned on;
    (2) detecting a temperature of said air through a sensor;
    (3) increasing an open rate of said louver gradually and then increasing a rotational speed of said fan gradually when said temperature of said air is risen over a predetermined temperature;
    (4) decreasing said rotational speed of said fan gradually and then decreasing said open rate of said louver gradually when said temperature of said air is lowered down and said rotational speed is higher than said predetermined rotational speed; and
    (5) closing said louver when said system is turned off.

2. The method according to claim 1, wherein said projection system further comprises an air outlet, said louver is installed at said air outlet.

3. The method according to claim 1, wherein in said step (3), said temperature of said aid is continuously risen, increase said rotational speed of said fan gradually when said open rate of said louver is increased to the maximum.

4. The method according to claim 1, wherein in said step (4), decrease said open rate of said louver gradually when said temperature of said air is lowered down and said rotational speed of said fan is decreased to said predetermined rotational speed.

5. The method according to claim 1, wherein at least one diversion plate is installed in said louver, a plurality of vents are disposed in said diversion plate, and said louver is closed when said system is turned on.

6. The method according to claim 1, wherein at least one diversion plate without vents is installed in said louver, and said louver has a predetermined open rate when said system is turned on.

7. The method according to claim 1, wherein at least one diversion plate without vents is installed in said louver, and said louver is fully opened when said system is turned on.

8. The method according to claim 1, wherein said projection system comprises an air inlet, a louver is installed in said air inlet, and an open rate thereof is changed as said louver of said air outlet.

9. The method according to claim 1, wherein said projection system comprises an air inlet, a louver is installed in said air inlet, and said air inlet is closed when said system is turned off.

10. An apparatus for adjusting cooling in a projection system, comprising:
    a fan, used to yield airflow to cool said projection system;
    a louver, located in said airflow and a plurality of freely rotated diversion plates being installed therein;
    a driving element, used to drive said diversion plates to rotate; and
    a sensor, installed between said fan and said louver to detect temperature;
    Wherein said sensor is used to detect the rise and the drop in said temperature so as to adjust a rotational speed of said fan or a rotated angle of said diversion plates.

11. The apparatus according to claim 10, wherein said louver is installed on an air outlet in said system.

12. The apparatus according to claim 11, wherein a light shielding airflow channel is disposed before said air outlet.

13. The apparatus according to claim 11, wherein said diversion plates can be closely connected with one another to seal said air outlet.

14. The apparatus according to claim 10, wherein a rotating axis is disposed at the center of each said diversion plate and a pair of vents are respectively disposed at two sides of said axis.

15. The apparatus according to claim 10, wherein said driving element is a stepper motor.

16. The apparatus according to claim 10, wherein one end of each said diversion plate is connected to a pivoting axis, one end of a link lever is connected to each said pivoting axis, another end of said link lever is connected movably to a supporting shaft and said supporting shaft is connected to said driving element.

17. The apparatus according to claim 10, a shape of each said diversion plate is streamlined and an axis is disposed therein so as to allow said diversion plates to rotate around said axis freely.

* * * * *